United States Patent [19]

Suzuki et al.

[11] 4,428,785

[45] Jan. 31, 1984

[54] BINDER FOR A POLYDIENE COMPOSITE PROPELLANT

[75] Inventors: Shigeru Suzuki, Sayama; Daizo Fukuma, Sakado; Kensho Shirota, Sayama, all of Japan

[73] Assignee: Nissan Motor Co., Ltd., Yokohama, Japan

[21] Appl. No.: 198,550

[22] Filed: Oct. 20, 1980

[30] Foreign Application Priority Data

Oct. 24, 1979 [JP] Japan .................. 54-137305

[51] Int. Cl.$^3$ .............................................. C06B 45/10
[52] U.S. Cl. .................. 149/19.4; 149/19.9; 523/180
[58] Field of Search ............... 149/19.4, 19.9; 523/180

[56] References Cited

U.S. PATENT DOCUMENTS

| | | | |
|---|---|---|---|
| 3,695,952 | 10/1972 | Allen | 149/19.9 |
| 3,727,407 | 4/1973 | Rains et al. | 149/20 |
| 3,745,074 | 7/1973 | Allen | 149/7 |
| 3,748,199 | 7/1973 | Vriesen et al. | 149/19.9 |
| 3,758,426 | 9/1973 | Boivin et al. | 149/19.9 |
| 3,801,385 | 4/1974 | Mastrolia et al. | 149/19.9 |
| 3,883,375 | 5/1975 | Mastrolia et al. | 149/19.9 |
| 3,888,707 | 6/1975 | Rothstein | 149/19.9 |
| 4,019,933 | 4/1977 | Cucksee et al. | 149/19.4 |
| 4,083,834 | 4/1978 | Komatsu et al. | 528/498 |
| 4,158,583 | 6/1979 | Frosch | 149/19.4 |

FOREIGN PATENT DOCUMENTS

WO80/00698  4/1980  PCT Int'l Appl. .......... 149/19.9

OTHER PUBLICATIONS

Perrault et al., "Polyesters Azotés", DREV. R-639/71, 17 pp., Defence Research Board (1971) Quebec, Canada.
POLY B-D, Research Bulletin Number 508, Sinclair.

*Primary Examiner*—Edward A. Miller
*Attorney, Agent, or Firm*—Schwartz, Jeffery, Schwaab, Mack, Blumenthal & Koch

[57] ABSTRACT

A binder for a polydiene composite propellant obtained by reaction of a combination of (a) a polydiene glycol having a hydroxyl group number of 1.8-2.1 and a number average molecular weight of 1,000-5,000, (b) a polydiene polyol having a hydroxyl group number from more than 2.1 to less than 4.0 and a number average molecular weight compound of 1,000-5,000, and (c) a diisocyanate.

20 Claims, No Drawings

BINDER FOR A POLYDIENE COMPOSITE PROPELLANT

BACKGROUND OF THE INVENTION

The present invention relates to a binder for a polydiene composite propellant, particularly a polybutadiene composite propellant.

Recently, as a binder for a polybutadiene propellant, particularly a propellant using a small amount of a binder, a binder consisting mainly of a reaction product of a hydroxyl terminated polybutadiene and a diisocyanate has been noticed. The inventors have already proposed a binder which can provide uniform physical properties and prolong the pot life and therefore improve the producibility and physical properties of a propellant, which is produced by reacting a polydiene glycol having a hydroxyl group number of 1.8–2.1 and a number average molecular weight of 1,000–5,000, with a trifunctional cross-linking agent, a diisocyanate and bifunctional chain extender (see Japanese Patent Application No. 123,345/78, filed on Oct. 6, 1978). When a propellant using a small amount of a binder is produced, the viscosity of the binder is an important factor, so that the production must be carried out in one-shot process and therefore the chain extending reaction and the cross-linking reaction should be controlled by properly selecting the combination of the compounding agents but in the above described binder system, the pot life becomes long and the mechanical properties are improved, but the reactivity of the diisocyanate to the polydiene glycol and to the trifunctional cross-linking agent is different and the distribution of the cross-linked structure is apt to become nonuniform and the curing time becomes too long and the cost for controlling the temperature in chamber becomes higher. The pot life is substantially determined by the reaction of the polydiene glycol with the diisocyanate but this reaction is carried out at such a smooth rate that no catalyst is necessary. On the other hand, the curing time is substantially determined by the reaction of the trifunctional cross-linking agent with the diisocyanate but if it is intended to shorten the curing time, a catalyst is necessary and this catalyst influences the reaction of the above described polydiene glycol with the diisocyanate and the pot life tends to become short. This is due to the addition of the trifunctional cross-linking agent.

SUMMARY OF THE INVENTION

An object of the present invention is to obviate this drawback and to provide a binder having physical properties improved for a propellant using a small amount of a binder. Namely, the binder according to the present invention includes at least three components (a) a polydiene glycol having a hydroxyl group number of 1.8–2.1 and a number average molecular weight of 1,000–5,000, (b) a polydiene polyol having a hydroxyl group number from more than 2.1 to less than 4.0 and a number average molecular weight of 1,000–5,000 and (c) a diisocyanate.

DETAILED DESCRIPTION OF PREFERRED EMBODIMENTS

The polydiene glycols used as the component (a) in the present invention include polybutadiene glycol, polyisoprene glycol and the like, which are usually produced through anion polymerization reaction of a diene compound and particularly, polybutadiene glycol (abbreviated as HTPB hereinafter) is preferable, so that the present invention will be explained with respect to HTPB as a representative.

The typical process for producing HTPB to be used as the component (a) comprises polymerizing butadiene in an organic solvent by using dilithium compound as a catalyst and treating the formed polymer with ethylene oxide (formation of primary hydroxyl group), propylene oxide or an aldehyde (formation of secondary hydroxyl group) or a ketone (formation of tertiary hydroxyl group) to hydroxylate both terminal groups.

The polydiene glycols to be used as the component (a) should have hydroxyl group of 1.8–2.1, preferably 1.9–2.0 and a number average molecular weight of 1,000–5,000.

The polydiene polyols used as the component (b) in the present invention include polybutadiene polyol, polyisoprene polyol and the like. The polydiene polyols to be used as the component (b) are preferred to have hydroxyl group from more than 2.1 to less than 4.0 and in order to obtain the more preferable cross-linking effect, the hydroxyl group number is preferred to be 2.4–3.5, more particularly 2.5–3.2. The number average molecular weight of the polydiene polyol must be 1,000–5,000, preferably 2,000–4,500, more particularly 3,000–4,500. The polydiene polyols to be used as the component (b) are usually produced by radical polymerization reaction of diene compounds. Such products are, for example, R-45 made by ARCO Chemical Co., Ltd., U.S.A. (hydroxyl group: 2.2–2.5, number average molecular weight: 2,000–3,000, synthesized through radical polymerization reaction of butadiene) and a product obtained by radical polymerization reaction of butadiene and having a hydroxyl group number of 2.6–3.0 and a number average molecular weight of 2,000–4,500.

The compounding ratio of the component (b) in the binder of the present invention is 1–10 moles, preferably 1–3 moles, more preferably 1.5–2.3 moles based on 10 moles of the component (a) in view of the combination of the mechanical properties of the maximum tensile strength $\sigma_m$ and the elongation $\epsilon_m$ at the maximum stress (see the following Table 1) of the propellant.

The diisocyanates (component (c)) used in the present invention may be any compound having two isocyanate groups in one molecule. These compounds are, for example, aliphatic diisocyanates, such as tetramethylene-1,4-diisocyanate, hexamethylene-1,6-diisocyanate, 1,3-(or 1,4-)xylylene diisocyanate, dineryl diisocyanate and the like, alicyclic diisocyanates, such as $\omega,\omega'$-diisocyanate-1,2-dimethyl cyclohexane, 1-methylcyclohexane-2,4-(or 2,6-)diisocyanate, 1,3-(or 1,4-)cyclohexyl diisocyanate, methylene-bis(4-cyclohexylisocyanate), isophorone diisocyanate and the like, aromatic diisocyanates, such as 2,4-(or 2,6-)tolylene diisocyanate, 5-chloro-2,4-tolylene diisocyanate, diphenyl-4,4'-diisocyanate, diphenyldimethylmethane-4,4'-diisocyanate, m-(or p-)phenylene diisocyanate, 1,4-(or 1,5-, 2,6-, 2,7-)naphthalene diisocyanate, diphenylmethane-4,4'-diisocyanate, diphenyldimethylmethane-4,4'-diisocyanate, diphenylether-4,4'-diisocyanate, 3,3'-dimethyldiphenyl-4,4'-diisocyanate and the like. These diisocyanates may be used alone or in admixture of two or more compounds.

The compounding ratio of the diisocyanate is preferred to be 0.8–1.2, particularly 1.0–1.1 in a ratio of NCO group per the total amount of hydroxyl group and NH₂ group (shown by [OH]+[NH₂]), that is NCO/([OH]+[NH₂]) (equivalent ratio).

In the binder according to the present invention, if necessary a bifunctional chain extender may be compounded. As the chain extender, use may be made of diamines, diols, amino alcohols (compounds having one NH₂ group and one OH group in one molecule) and the like.

The diamines to be used as the chain extender are, for example, aromatic diamines, such as 4,4'-methylenebis(2-chloroaniline), methylenedianiline, methylenebis(2-methoxyaniline), 2,2',5-trichloro-4,4'-methylenedianiline, o-phenylenediamine, m-phenylenediamine, p-phenylenediamine, 2,6-dichloro-p-phenylenediamine, tolylene-2,4-diamine, toluidine, dianisidine, diphenylether-4,4'-diamine, 4,4'-diphenyldiaminosulfone, 3,3'-diphenyldiaminosulfone, naphthalene-1,5-diamine, 2,4-diaminocumene, m-tolylenediamine, p-chloro-o-phenylenediamine, o-chloro-p-phenylene-diamine and the like, aliphatic diamines, such as ethylenediamine, trimethylenediamine, hexamethylene-1,6-diamine, piperazine, propylenediamine and the like, hydrazine and the like.

The diols to be used as the chain extender are, for example, ethylene glycol, propylene glycol, propane-1,3-diol, allyloxypropanediol, butane-1,4-diol, butane-1,3-diol, butane-2,3-diol, butane-2,4-diol, butanedioxyethyl glycol, butene-1,4-diol, butyn-1,4-diol, pentane-1,4-diol, pentane-1,5-diol, hexane-1,6-diol, decane-1,10-diol, dodecane-1,12-diol, octadecane-7,18-diol, 4,4'-dihydroxydicyclohexylmethane, 4,4'-dihydroxydicyclohexyldimethylmethane, bis-2-hydroxyethyl terephtharate, xylylene glycol, hydroquinone, 4,4'-dihydroxydiphenylmethane, 4,4'-dihydroxydiphenyldimethylmethane, resorcinol, thiodiglycol, polydiene glycols having a molecular weight of 500-1,000 and the like.

The aminoalcohols to be used as the chain extender are, for example, 2-aminoethyl alcohol, 4-amino-n-butyl alcohol, aminophenol and the like.

The chain extender may be used alone or in admixture of two or more compounds.

The compounding ratio of the chain extender is preferred to be not more than 2 moles based on 10 moles of polydiene glycol used as the component (a).

To the binder according to the present invention may be added a plasticizer, diluent, catalyst and the like, if necessary. As the plasticizer, mention may be made of dioctyl adipate, dioctyl sebacate, isodecyl pelargonate and the like. As the diluent, mention may be made of polybutene, diene polymer and the like. As the catalyst, mention may be made of dibutyltin dilaurate, acetylacetone iron salt and the like.

Since the binder according to the present invention uses polydiene glycols having a hydroxyl group number of not less than 1.8 and a number average molecular weight of not less than 1,000, the satisfactory chain extension and cross-linkage are carried out. Accordingly, the physical properties, such as the stress at 100% elongation, the tensile strength and the like of the cured product are far more excellent than those when a polydiene glycol having a hydroxyl group number of less than 1.8 is used. Since the number average molecular weight of the polydiene glycol is not greater than 5,000, the viscosity prior to the curing is low, so that it is possible to lower the viscosity of the slurry formed by mixing solid grains to the binder. The viscosity (60° C.) of the slurry formed by mixing 11% by weight of the binder, 73% by weight of a powdery oxidizer and 16% by weight of powdery aluminum can be reduced to 3–4 kps when the binder according to the present invention is used.

In the binder according to the present invention, the polydiene polyol having a hydroxyl group number from more than 2.1 to less than 4.0 and a number average molecular weight of 1,000–5,000 is used instead of cross-linking agents having three or more functional groups, which have been heretofore usually used, so that the reactivity of the cross-linking agent with the diisocyanate is equal to the reactivity of the polydiene glycol with the diisocyanate and the network structure having a high uniformity and a preferable distance can be formed, so that the physical properties of the propellant can be made uniform.

Furthermore, in the binder of the present invention, by selecting the compounding ratio of the polydiene glycol used as the component (a) to the component (b), the cross-linkage density can be previously set and the desired cured product can be obtained and the physical properties of the binder and the propellant can be controlled over a broad range.

An explanation will be made with respect to the process for measuring the main properties.

NUMBER AVERAGE MOLECULAR WEIGHT

A sample polymer is dried under vacuum at a pressure of less than 4 mmHg at 70° C. for 17 hours and then benzene is used for a solvent and benzil is used for a comparative sample as a solvent and the measurement is effected by using a molecular weight measuring apparatus (Hitachi 117 type).

HYDROXYL GROUP NUMBER

This number is calculated by dividing the number average molecular weight of a sample polymer by OH equivalent molecular weight. OH equivalent molecular weight is determined as follows. The dried sample polymer as described above is dissolved in carbon tetrachloride and the resulting solution is reacted with an amount exceeding the equivalent of hexamethyldisilazane and trimethylchlorosilane and then the above described two unreacted silyl forming agents and the reaction product of ammonium chloride are removed, after which the following A, B and C are measured by means of NMR apparatus having a high resolving power (JNM-4H-100 type, made by Japan Electron Co., Ltd.) and the calculation is made following to the following equation.

$$\text{OH equivalent molecular weight} = \frac{54.1 \times 9 \times (B + C)}{(2 + X) \times A} + 73$$

A: Proton amount of $-OSi(CH_3)_3$
B: Proton amount of $=CH_2$ at 1,2-bond in polydiene
C: Sum of proton amount of $=CH-$ at 1,4-bond in polydiene and proton amount of $=CH-$ at 1,2-bond in polydiene
X: 1,2-bond ratio in polydiene (=2B)/(B+2C)

MECHANICAL PROPERTIES OF THE BINDER (CURED PRODUCT)

Following to JIS K6301 (physical test process of vulcanized rubber).
(1) Tensile test condition
 Specimen: No. 3 dumbbell
 Tensile rate: 1,000 mm/min.

Temperature: Room temperature
(2) Measured item
$\sigma_{100}$ (kg/cm$^2$) = stress at 100% elongation
$\sigma_b$ (kg/cm$^2$) = tensile strength
$\epsilon_b$ (%) = elongation

MECHANICAL PROPERTIES OF THE PROPELLANT

Following to the tensile test manner under the following conditions.
(1) The shape of the specimen follows to JANNAF type of the following dimensions.
Total length: 12.7 cm (5")
Total width: 2.54 cm (1")
Thickness: 1.27 cm (0.50")
Span between marked points: 5.08 cm (2.0")
Width of the portion to be measured: 0.95 cm (0.375")
Shoulder portion R: 0.762 cm (0.3000").
(2) Tensile rate = 50 mm/min.
Temperature = Room temperature
(3) Measured item
$\sigma_m$ (kg/cm$^2$) = Maximum tensile strength
$\epsilon_m$ (%) = Elongation at maximum stress
E (kg/cm$^2$) = Initial Young's modulus $$E = (\tfrac{1}{2}\sigma_m / \epsilon \tfrac{1}{2}\sigma_m) \times 100$$

The following examples are given for the purpose of illustration of this invention and are not intended as limitations thereof.

EXAMPLES 1–11

The binders having the composition as shown in Table 1 were mixed with a burning assistant (powdery aluminum) and then powdery ammonium perchlorate was added thereto and the mixture was mixed in a mixer under vacuum at a pressure of 5 mmHg for about 30 minutes and the obtained mixture was charged in a mold and cured at 60° C. for 160 hours to prepare propellants. The pot life in this case was 8–10 hours.

The composition of the propellants was 11% by weight of the binder, 73% by weight of ammonium perchlorate and 16% by weight of powdery aluminum.

For measuring the mechanical properties of the binder, only the binder having the composition shown in Table 1 was charged in a mold and cured at 60° C. for 160 hours to prepare a specimen for measuring the mechanical properties of the binder.

The mechanical properties of the binder and the propellant are shown in Table 1.

TABLE 1

| | | | Example 1 | 2 | 3 | 4 | 5 | 6 | 7 | 8 | 9 | 10 | 11 |
|---|---|---|---|---|---|---|---|---|---|---|---|---|---|
| Binder composition | Polybutadiene glycol component (a) | Hydroxyl group number | 1.92 | 1.92 | 1.92 | 1.92 | 1.92 | 1.89 | 1.89 | 1.89 | 1.89 | 1.89 | 1.89 |
| | | Number average molecular weight | 2754 | 2754 | 2754 | 2754 | 2754 | 2730 | 2730 | 2730 | 2730 | 2730 | 2730 |
| | | Added amount (mole) | 10 | 10 | 10 | 10 | 10 | 10 | 10 | 10 | 10 | 10 | 10 |
| | Polybutadiene polyol component (b) | Hydroxyl group number | 2.70 | 2.70 | 2.70 | 2.70 | 2.70 | 2.73 | 2.73 | 2.73 | 2.73 | 2.73 | 2.73 |
| | | Number average molecular weight | 2440 | 2440 | 2440 | 2440 | 2440 | 4200 | 4200 | 4200 | 4200 | 4200 | 4200 |
| | | Added amount (mole) | 3 | 2 | 1.5 | 1.0 | 1.0 | 2.0 | 2.3 | 2.5 | 2.3 | 2.0 | 2.3 |
| | Curing agent component (c) | Kind | IPDI | HDI | HDI | HDI | HDI | IPDI | IPDI | IPDI | IPDI | IPDI | IPDI |
| | | Added amount (mole) | 13.7 | 12.3 | 12.6 | 11.0 | 12.0 | 13.4 | 13.7 | 12.9 | 12.5 | 12.8 | 13.2 |
| | Chain extender | Kind | — | — | — | — | MTDA | — | — | — | — | — | — |
| | | Added amount (mole) | — | — | — | — | 1.0 | — | — | — | — | — | — |
| | Plasticizer | Kind | DOA | DOA | DOA | DOA | DOA | DOA | DOA | DOA | DOA | DOA | DOA |
| | | Weight % | 10 | 10 | 10 | 10 | 10 | 10 | 10 | 10 | 10 | 10 | 10 |
| | Diluent | Kind | NFPB | NFPB | NFPB | NFPB | NFPB | NFPB | NFPB | NFPB | NFPB | NFPB | NFPB |
| | | Weight % | 5 | 5 | 5 | 5 | 5 | 5 | 5 | 5 | 5 | 5 | 5 |
| Mechanical properties of binder | | $\sigma_{100}$ (kg/cm$^2$) | 0.6 | 0.7 | 0.6 | 0.4 | 0.7 | 0.6 | 0.7 | 0.5 | 0.5 | 0.6 | 0.7 |
| | | $\sigma_b$ (kg/cm$^2$) | 6.3 | 7.5 | 6.2 | 4.6 | 7.1 | 7.8 | 7.6 | 6.5 | 5.0 | 7.5 | 7.8 |
| | | $\epsilon_b$ (%) | 1100 | 1000 | 1250 | 1800 | 950 | 1400 | 1300 | 1500 | 1650 | 1450 | 1300 |
| Mechanical properties of propellant | | $\sigma_m$ (kg/cm$^2$) | 8.1 | 9.3 | 7.8 | 7.1 | 8.2 | 10.0 | 9.9 | 8.2 | 6.8 | 9.6 | 10.1 |
| | | $\sigma_m$ (%) | 24 | 25 | 30 | 38 | 31 | 35 | 33 | 38 | 40 | 37 | 33 |
| | | E (kg/cm$^2$) | 46 | 60 | 51 | 42 | 54 | 50 | 54 | 38 | 32 | 50 | 58 |

Note:
MTDA ... m-tolylenediamine
IPDI ... isophorone diisocyanate
HDI ... hexamethylene diisocyanate
DOA ... dioctyl adipate
NFPB ... non-functional polybutadiene.

The propellants mentioned above have the satisfactory mechanical properties. The pot life is 8–10 hours, so that a sufficient time for preparing the propellant is obtained and the curing time is 160 hours and is substantially the same as the curing time of the usual propellant. Furthermore, the polydiene polyol having a heat generation amount of about 11,000 cal/g is added in the above described binder, so that the specific impulse of a rocket motor is improved.

What is claimed is:
1. A polydiene composite propellant having a binder obtained by reacting (a) polydiene glycol having a hydroxyl group number of about 1.8–2.1 and a number average molecular weight of about 1,000–5000, wherein said polydiene glycol is obtained by polymerizing butadiene in an organic solvent by using a dilithium compound as a catalyst and treating the resulting polymer with a substance selected from the group consisting of ethylene oxide, propylene oxide, an aldehyde or a ke- tone to hydroxylate both terminal groups, with (b) a polyol component consisting essentially of a polydiene polyol having a hydroxyl group number from more than about 2.1 to less than about 4.0 and a number average molecular weight of about 1,000–5,000, said polydiene polyol being produced by radical polymerization of a diene compound and (c) a diisocyanate.

2. A propellant as claimed in claim 1, wherein the polydiene glycol is polybutadiene glycol.

3. A propellant as claimed in claim 1, wherein the polydiene polyol is polybutadiene polyol.

4. A propellant as claimed in claim 1, wherein the polydiene polyol is used in an amount of 1–10 moles per 10 mole of the polydiene glycol.

5. A propellant as claimed in claim 4, wherein the polydiene polyol is present in an amount from about 1.0–3.0 moles per 10 moles of the polydiene glycol.

6. A propellant as claimed in claim 1, further comprising a bifunctional chain extender selected from the group comprising diamines, diols, amino alcohols, or admixtures thereof.

7. A propellant as claimed in claim 5, wherein the polydiene polyol is present in an amount from about 1.5–2.3 moles per 10 moles of the polydiene glycol.

8. A propellant as claimed in claim 1, wherein the polydiene glycol comprises polyisoprene glycol.

9. A propellant as claimed in claim 1, wherein the hydroxyl number of the polydiene glycol ranges from about 1.9–2.0.

10. A propellant as claimed in claim 1, wherein the polydiene polyol comprises polyisoprene polyol.

11. A propellant as claimed in claim 1, wherein the hydroxyl number of the polydiene polyol ranges from about 2.4–3.5.

12. A propellant as claimed in claim 11, wherein said hydroxyl number of said polydiene polyol ranges from about 2.5–3.2.

13. A propellant as claimed in claim 1, wherein said molecular weight of said polydiene polyol ranges from about 2,000–4,500.

14. A propellant as claimed in claim 13, wherein said molecular weight of said polydiene polyol ranges from about 3,000–4,500.

15. A propellant as claimed in claim 1, wherein said polydiene polyol is obtained by the radical polymerization of butadiene, said polydiene polyol having a hydroxyl group number of 2.6–3.0 and a number average molecular weight of about 2,000–4,500.

16. A propellant as claimed in claim 1, wherein the compounding ratio of the diisocyanate ranges from about 0.8–1.2 in a ratio NCO group per total amount of hydroxyl and $NH_2$ groups.

17. A propellant as claimed in claim 16, wherein said ratio ranges from about 1.0–1.1.

18. A propellant as claimed in claim 1, wherein the viscosity of the binder ranges from 3–4 KPS.

19. A propellant as claimed in claim 1, further comprising at least one additive selected from the group comprising a plasticizer, a catalyst or a diluent.

20. A propellant as claimed in claim 6, wherein the compounding ratio of the chain extruder, preferably is less than 2 moles per 10 moles of the polydiene glycol.

* * * * *